(12) United States Patent
Hadwani et al.

(10) Patent No.: US 9,907,227 B2
(45) Date of Patent: Mar. 6, 2018

(54) GEAR BOX ASSEMBLY FOR A TWIN ROTOR COMBINE

(71) Applicant: CNH Industrial America LLC, New Holland, PA (US)

(72) Inventors: Bharat Hadwani, Bolingbrook, IL (US); Peter J. Ungs, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/016,046

(22) Filed: Feb. 4, 2016

(65) Prior Publication Data

US 2016/0150726 A1    Jun. 2, 2016

Related U.S. Application Data

(62) Division of application No. 13/832,973, filed on Mar. 15, 2013, now Pat. No. 9,285,022.

(51) Int. Cl.

| F16H 37/06 | (2006.01) |
|---|---|
| A01D 41/12 | (2006.01) |
| A01F 7/06 | (2006.01) |
| A01F 12/00 | (2006.01) |
| F16H 57/04 | (2010.01) |
| F16H 57/02 | (2012.01) |

(52) U.S. Cl.
CPC ............. *A01D 41/12* (2013.01); *A01F 7/06* (2013.01); *A01F 12/00* (2013.01); *F16H 37/065* (2013.01); *F16H 57/0423* (2013.01); *F16H 2057/02013* (2013.01); *Y10T 74/19079* (2015.01)

(58) Field of Classification Search
CPC . A01D 41/12; A01F 7/06; A01F 12/00; F16H 37/065; F16H 57/0423; F16H 2057/02013
See application file for complete search history.

(56) References Cited

U.S. PATENT DOCUMENTS

| 1,449,164 A | 3/1923 | Buhr |
|---|---|---|
| 1,451,722 A | 4/1923 | Valentine |
| 1,532,270 A | 4/1925 | Shield |

(Continued)

FOREIGN PATENT DOCUMENTS

| EP | 1044598 A1 | 10/2000 | |
|---|---|---|---|
| GB | 600641 A * | 4/1948 | ........... F02M 35/026 |

(Continued)

*Primary Examiner* — Zakaria Elahmadi
(74) *Attorney, Agent, or Firm* — Patrick M. Sheldrake (57) ABSTRACT

A gear box assembly for a twin rotor combine is provided. The gear box assembly includes a two speed gear box having a casing, an input shaft, an output shaft, and a two speed gear assembly housed within the casing and operatively connected between the input shaft and the output shaft. The gear box assembly also includes a splitter gear box operatively connected to the output shaft. The splitter gear box includes a housing, and a splitter gear assembly housed within the housing and configured to split a torque provided by the output shaft between a first output shaft and a second output shaft extending from the housing in a direction opposite a direction the output shaft extends from the two speed gear box. The two speed gear box is pivotable relative to the splitter gear box housing.

8 Claims, 13 Drawing Sheets

(56) References Cited

U.S. PATENT DOCUMENTS

| | | | |
|---|---|---|---|
| 1,604,401 A * | 10/1926 | Fisher | F16H 1/10 |
| | | | 29/893.1 |
| 1,810,635 A | 6/1931 | White | |
| 2,487,960 A | 11/1949 | Anderson | |
| 2,655,818 A | 10/1953 | Bodle | |
| 2,751,798 A | 6/1956 | Keese et al. | |
| 2,813,435 A | 11/1957 | Schumb | |
| 2,906,137 A | 9/1959 | Bade | |
| 3,049,929 A * | 8/1962 | Wagner | B60K 17/28 |
| | | | 74/15.2 |
| 3,065,811 A | 11/1962 | Parrett | |
| 3,126,104 A | 3/1964 | O'Shields | |
| 3,132,526 A | 5/1964 | Bus | |
| 3,162,061 A | 12/1964 | Belezos | |
| 3,288,534 A * | 11/1966 | Gonski | E21C 27/22 |
| | | | 299/59 |
| 3,375,738 A | 4/1968 | Love et al. | |
| 3,383,947 A | 5/1968 | Higgins | |
| 3,626,472 A | 12/1971 | Rowland-Hill | |
| 3,956,131 A * | 5/1976 | Harvey | B01D 17/00 |
| | | | 210/202 |
| 4,160,456 A * | 7/1979 | Hawkins | A01D 69/06 |
| | | | 460/116 |
| 4,483,128 A * | 11/1984 | Hawkins | A01D 69/06 |
| | | | 475/263 |
| 4,503,731 A | 3/1985 | Tomlinson | |
| 4,739,773 A | 4/1988 | West et al. | |
| 4,829,850 A * | 5/1989 | Soloy | B64D 7/00 |
| | | | 248/554 |
| 4,924,689 A | 5/1990 | Wilson | |
| 5,035,682 A * | 7/1991 | Nakayama | F16H 3/093 |
| | | | 180/297 |
| 5,215,323 A * | 6/1993 | Cowan | B62M 11/145 |
| | | | 280/236 |
| 5,527,218 A | 6/1996 | Van Den Bossche et al. | |
| 5,960,671 A | 10/1999 | Nguyen | |
| 6,068,571 A | 5/2000 | Irwin | |
| 6,105,710 A * | 8/2000 | Vandepitte | B60K 17/04 |
| | | | 180/337 |
| 7,047,838 B2 * | 5/2006 | Varela | F16H 57/033 |
| | | | 74/606 R |
| 7,235,026 B2 | 6/2007 | Jonckheere et al. | |
| 7,284,458 B2 | 10/2007 | Magnusson et al. | |
| 7,427,232 B2 | 9/2008 | Schmidt et al. | |
| 7,811,162 B2 | 10/2010 | Flickinger | |
| 7,900,740 B2 | 3/2011 | Roley | |
| 8,282,351 B2 | 10/2012 | Nies | |
| 8,381,606 B2 * | 2/2013 | Furquim | F16H 63/302 |
| | | | 74/331 |
| 8,464,611 B1 | 6/2013 | Chandler | |
| 2011/0265593 A1 | 11/2011 | Minegishi et al. | |

FOREIGN PATENT DOCUMENTS

| | | | | |
|---|---|---|---|---|
| GB | 704344 A * | 2/1954 | | B65G 23/08 |
| GB | 2005383 A | 4/1979 | | |

* cited by examiner

GEAR BOX ASSEMBLY FOR A TWIN ROTOR COMBINE

This divisional application claims priority under 35 U.S.C. § 120 from co-pending U.S. patent application Ser. No. 13/832,973 filed on Mar. 15, 2013 by Bharat Hadwani and Peter J. Ungs with the same title, the full disclosure of which is hereby incorporated by reference.

BACKGROUND OF THE INVENTION

The present invention relates generally to a gear box assembly for a twin rotor agricultural combine. In particular, the present invention relates to a gear box assembly having a two speed gear box and a splitter gear box for operatively engaging dual rotors of the twin rotor combine.

Mechanical harvesting of grain has taken place for decades. However, efforts continue in the attempt to make harvesting operations more efficient and effective. A combine harvester generally includes a header which cuts the crop. The header then moves the cut crop into a feeder house. The feeder house lifts the cut crop into the threshing, separation and cleaning areas of the agricultural combine. The grain is separated from crop stalk by a rotor or threshing system. The grain is then separated, transported and stored in a grain tank. The chaff and trash are deposited from the rear of the agricultural combine. The grain stored in the grain tank is eventually discharged through a grain tank unloader tube. An operator usually runs these various operations from a glass-enclosed cab.

Certain combines are also designed to have a pair of rotors (i.e., twin rotors) for separating grain from crop stalk. Such twin rotor designs require a means to power the twin rotors. However, the problem with typical drive and gear systems is that they must function and operate in very confined and limited spaces within the combine. The present invention addresses the problem of providing a gear system compatible with the space constraints on typical combines in order to allow such combines to be configured or reconfigured as twin rotor combines.

BRIEF SUMMARY OF THE INVENTION

In accordance with a preferred embodiment, the present invention provides a gear box assembly for a twin rotor combine that includes a two speed gear box and a splitter gear box. The two speed gear box includes a casing, an input shaft, an output shaft, and a two speed gear assembly. The two speed gear assembly is housed within the casing and is operatively connected between the input shaft and the output shaft of the two speed gear box. The splitter gear box is operatively connected to the output shaft of the two speed gear box. The splitter gear box includes a housing and a splitter gear assembly. The splitter gear assembly is housed within the housing and configured to split a torque provided by the output shaft of the two speed gear box between a first output shaft and a second output shaft extending from the housing in a direction substantially opposite a direction the output shaft extends from the two speed gear box. The two speed gear box is pivotable about an axis extending coaxial with a longitudinal axis of the output shaft of the two speed gear box relative to the splitter gear box housing.

In accordance with another aspect, the present invention provides a gear box assembly for a twin rotor combine that includes a two speed gear box and a splitter gear box. The two speed gear box includes an input shaft, an output shaft, and a two speed gear assembly operatively connected between the input shaft and the output shaft. The splitter gear box is operatively connected to the output shaft of the two speed gear box. The splitter gear box includes a housing and a splitter gear assembly. The splitter gear assembly is housed within the housing and configured to split a torque provided by the output shaft of the two speed gear box between a first output shaft and a second output shaft extending from the housing in a direction substantially opposite a direction the output shaft extends from the two speed gear box. The housing includes a baffle extending along an inside surface of the housing for directing and maintaining a fluid housed within the housing proximate at least one of the first and second output shafts.

In accordance with yet another aspect, the present invention provides a gear box assembly for a twin rotor combine that includes a two speed gear box and a splitter gear box. The two speed gear box includes a casing, an input shaft, an output shaft, and a two speed gear assembly. The two speed gear assembly is housed within the casing and operatively connected between the input shaft and the output shaft. The splitter gear box is operatively connected to the output shaft of the two speed gear box. The splitter gear box includes a housing and a splitter gear assembly housed within the housing. The splitter gear box is configured to split a torque provided by the output shaft of the two speed gear box between a first output shaft and a second output shaft extending from the housing in a direction opposite a direction the output shaft extends from the two speed gear box. The two speed gear box is pivotable about an axis extending coaxial with a longitudinal axis of the output shaft of the two speed gear box relative to the splitter gear box housing. The housing includes a first baffle extending along an inside surface of the housing for directing and maintaining a fluid housed within the housing proximate the first output shaft and a second baffle extending along an inside surface of the housing for directing and maintaining a fluid housed within the housing proximate the second output shaft. The housing also includes a catch pocket extending from a wall of the housing, and at least one rib for directing the fluid housed within the housing towards the catch pocket.

BRIEF DESCRIPTION OF THE SEVERAL VIEWS OF THE DRAWINGS

The foregoing summary, as well as the following detailed description of a preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Reference will now be made in detail to a preferred embodiment of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," and "crop material" are used throughout the specification for convenience and it should be understood that these terms are not intended to be limiting. Thus, "grain" refers to that part of a crop which is harvested and separated from discardable portions of the crop material.

Referring now to FIGS. 1-14 there is shown a preferred embodiment of a gear box assembly 10 in accordance with the present invention for a twin rotor agricultural combine (not shown). A detailed description of the structure, function and operation of typical agricultural combines is not necessary for a complete understanding of the present invention; however such details of agricultural combines are disclosed in U.S. Pat. No. 7,427,232, the entire disclosure of which is hereby incorporated by reference herein.

The gear box assembly 10 is operatively connected to the combine's drive system 1000, which uses variable speed pulleys 1002, 1004 driven by an inverted V-belt 1006 to transmit power to the gear box assembly's rotor drive for driving twin rotors. Exemplary twin rotors applicable for being driven by the present gear box assembly include Case New Holland's CR Twin Rotor® and such twin rotors as disclosed in U.S. Pat. No. 7,811,162, the entire disclosure of which is hereby incorporated by reference herein. The drive system 1000 is itself driven by a power source on the combine, such as the combine's engine. The gear box assembly 10 includes a two speed gear box 12 and a splitter gear box 14.

Figure 1:
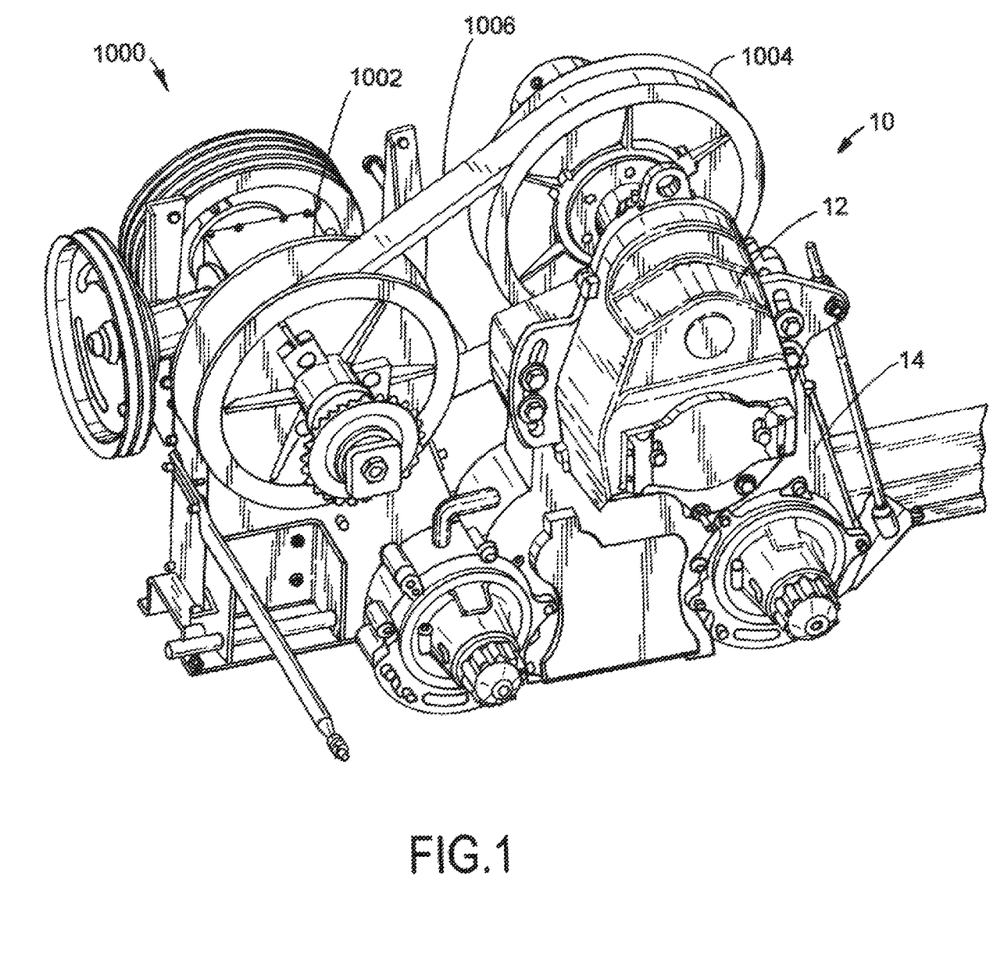
FIG. 1 is front perspective view of a gear box assembly in accordance with a preferred embodiment of the present invention.
Figure 2:
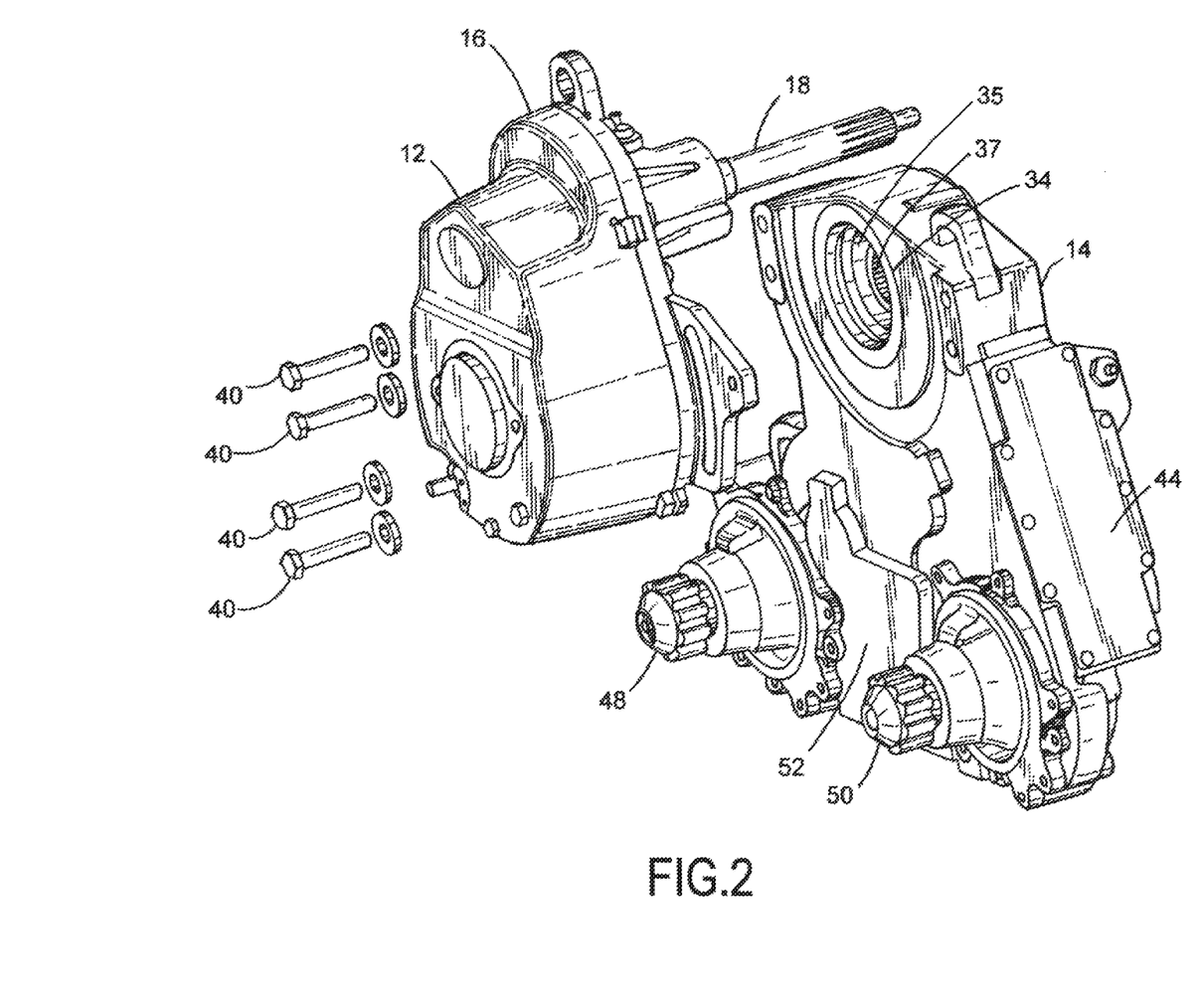
FIG. 2 is an exploded perspective view of the gear box assembly of FIG. 1.
Figure 3:
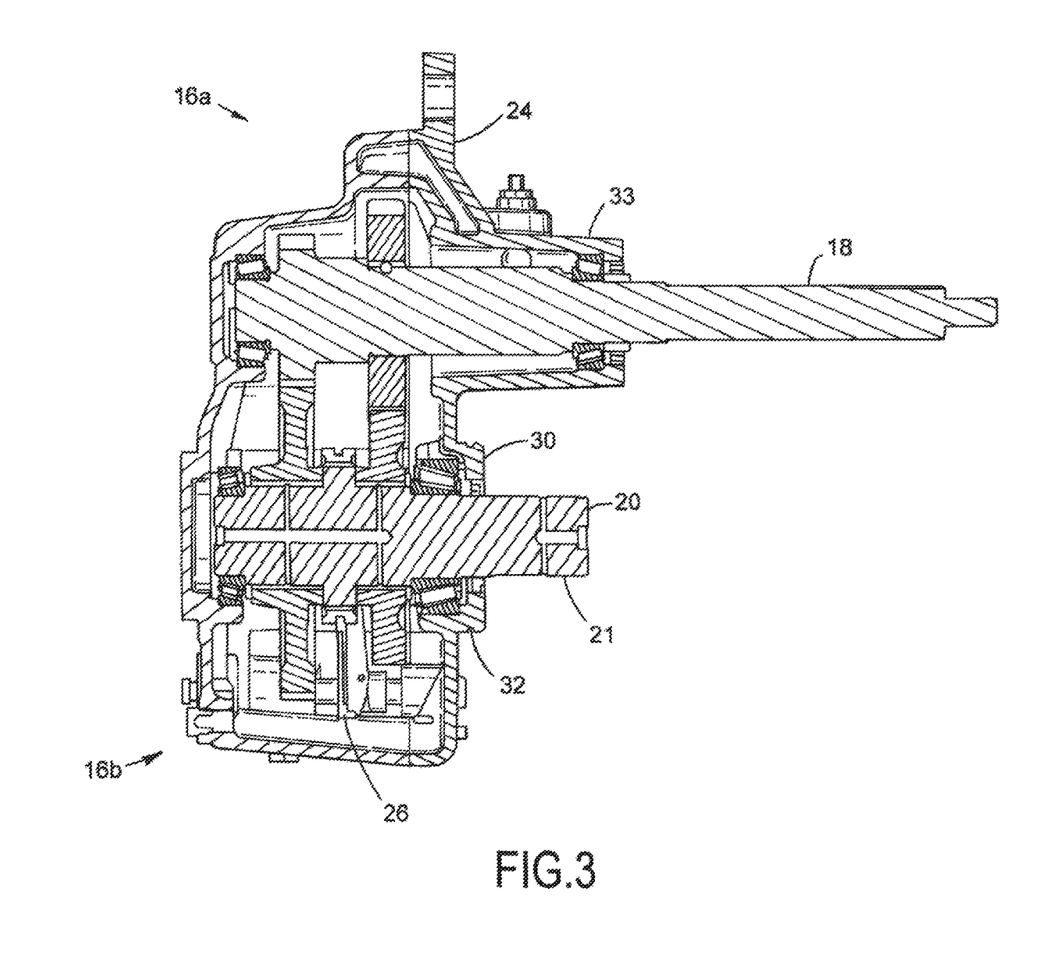
FIG. 3 is a cross-sectional side elevation view of a two speed gear box of the gear box assembly of FIG. 1.

The two speed gear box 12 is configured as best shown in FIGS. 2-6 and includes a casing 16, an input shaft 18, an output shaft 20, and a two speed gear assembly 22. The casing 16 is configured to completely enclose the two speed gear assembly 22 and retain a fluid, such as a lubricant therein. The casing 16 has a posterior face 24 about which includes two openings for receiving therethrough the input shaft 18 and the output shaft 20. Both the input shaft 18 and the output shaft 20 extend from the same side of the casing 16 i.e., the posterior face 24 in the same direction and parallel to each other. As shown in FIG. 3, the input shaft 18 is positioned above the output shaft 20. In other words, the input shaft 18 is positioned proximate a proximal end 16a of the casing 16 and the output shaft 20 is positioned proximate a distal end 16b of the casing 16.

Figure 4:
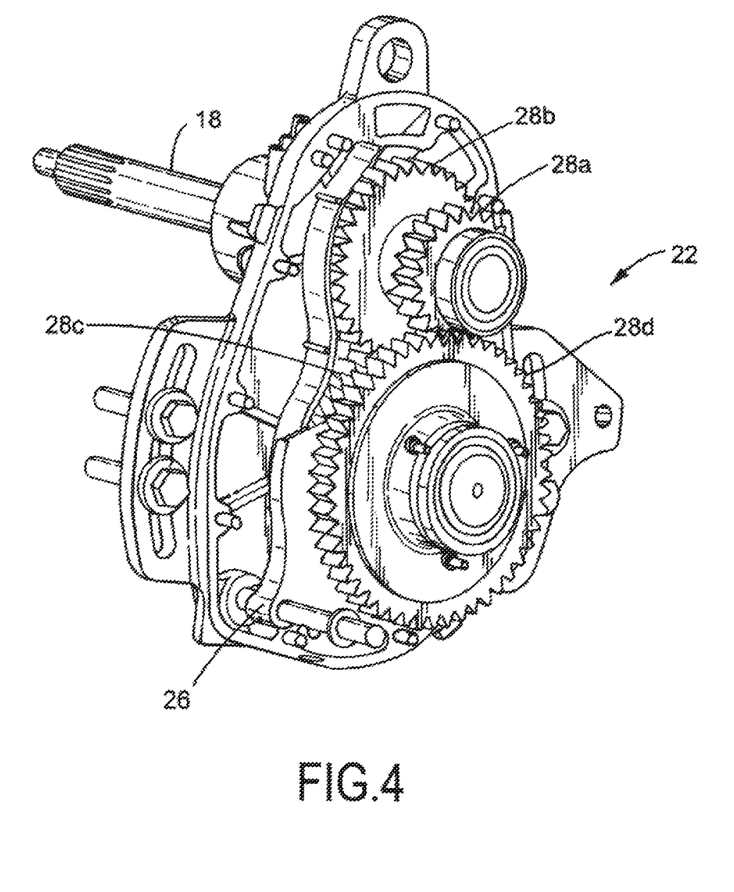
FIG. 4 is a perspective view of a two speed gear box of the gear box assembly of FIG. 1 without a casing.

Referring to FIG. 3, each of the input and output shafts 18, 20 terminate within the casing 16 about respective roller bearings and are operatively connected to each other by the two speed gear assembly 22, as best shown in FIG. 4. The two speed gear assembly 22 includes a series of gears configured to allow the input shaft 18 to drive the output shaft 20 between a low speed position, a high speed position and a neutral position by operation of a shift fork 26, as known in the art, see e.g., U.S. Pat. No. 4,160,456, the entire disclosure of which is hereby incorporated by reference herein. In sum, the two speed gear assembly 22 includes first and second gears 28a, 28b rotatable with the input shaft 18, and third and fourth gears 28c, 28d rotatable with the output shaft 20 that operates in conjunction with the shift fork 26. The first gear 28a is a relatively small diameter gear while the second gear 28b is a relative large diameter gear.

The posterior face 24 of the casing 16 includes a pilot 30 (FIG. 3) that extends outwardly therefrom in the form of an annular extension that circumscribes the output shaft 20. The pilot 30 also includes a seal groove 32 for receiving a seal (not shown). The pilot 30 is sized and configured to be received within a pilot bore 34 of the splitter gear box 14 (FIG. 2), as further described below. Situated above the pilot 30, as shown in FIG. 3, is a casing extension 33 that circumscribes the input shaft 18 and extends from a main portion of the casing 16 a length greater than a length the output shaft 20 extends from the casing 16.

Figure 5:
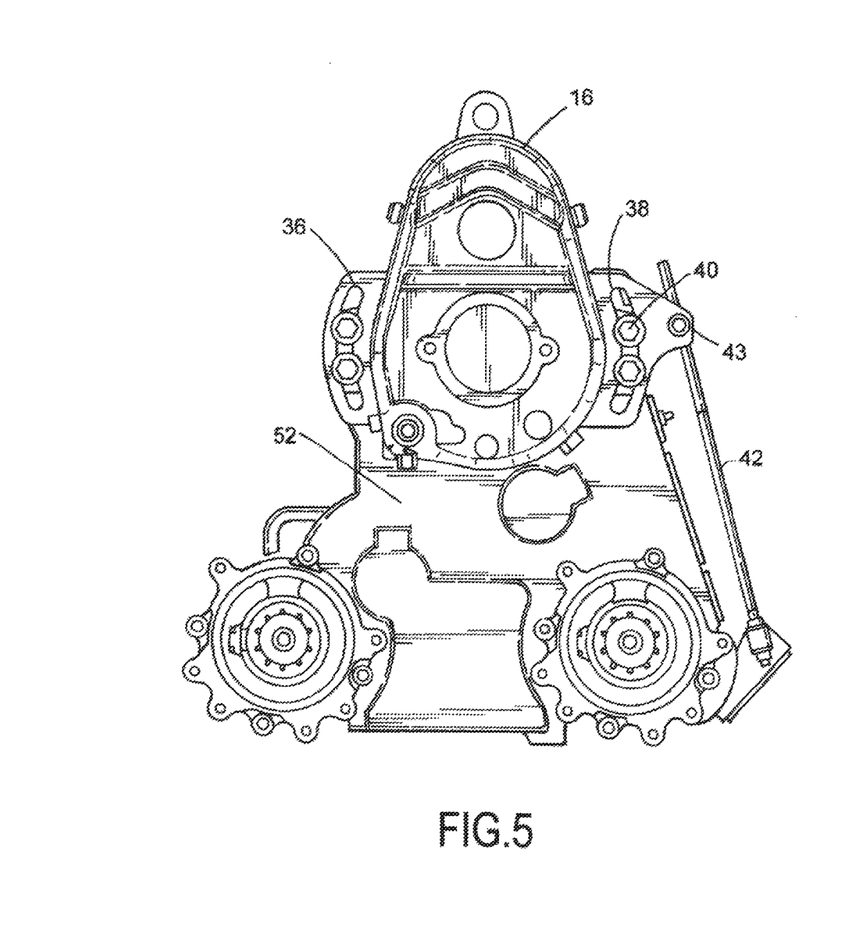
FIG. 5 is a front elevation view of the gear box assembly of FIG. 1.

Referring to FIG. 5, the casing 16 also includes a pair of arcuate slots 36, 38 about opposite sides of the casing 16. The arcuate slots 36, 38 are each configured to receive a fastener 40, and preferably a pair of fasteners, therethrough for securing the two speed gear box 12 to the splitter gear box 14. The size and length of the arcuate slots 36, 38 allow for the casing 16 to pivot about a central axis that extends coaxial to the output shaft 20 about +/−20 degrees and more preferably, about +/−14 degrees in order to allow a user to adjust the tensioning of the belt 1006 engaged with the two speed gear box 12.

Extending from the arcuate slot 38 about a left side of the casing 16 is a belt adjustment rod 42. The belt adjustment rod 42 is configured to slide along an attachment member 43 attached to the casing 16 and used to secure the position of the belt adjustment rod 42 in a fixed location. The belt adjustment rod 42 is used to facilitate adjusting the tensioning of the gear box assembly belt 1006. In other words, the adjustment rod 42 extends between the two speed gear box 12 and the splitter gear box 14 for pivotably adjusting the two speed gear box 12 relative to the splitter gear box 14.

The splitter gear box 14 is configured as best shown in FIGS. 1, 2, 5, 6 and 7, and includes a housing 44, a splitter gear assembly 46 (FIG. 7), and first and second output shafts 48, 50. The housing 44 is configured, as best shown in FIGS.

Figure 6:
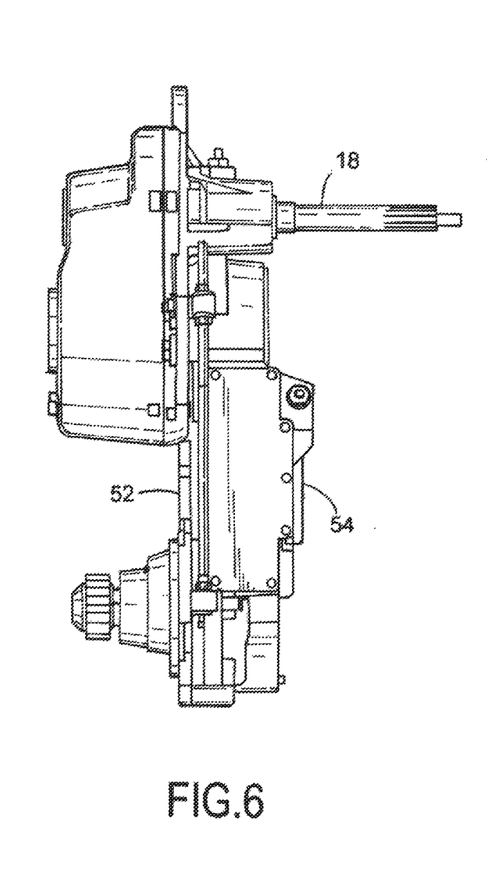
FIG. 6 is a left side elevation view of the gear box assembly of FIG. 5.

2 and 8-10. The housing 44 is sized and shaped to house the splitter gear assembly 46 therein along with a lubricant fluid (not shown). The splitter gear assembly 46 is positioned within the housing 44 adjacent an anterior wall 52. That is, the splitter gear assembly 46 is situated within the housing 44 closer to the anterior wall 52 than the posterior wall 54 (FIG. 6).

Figure 10:
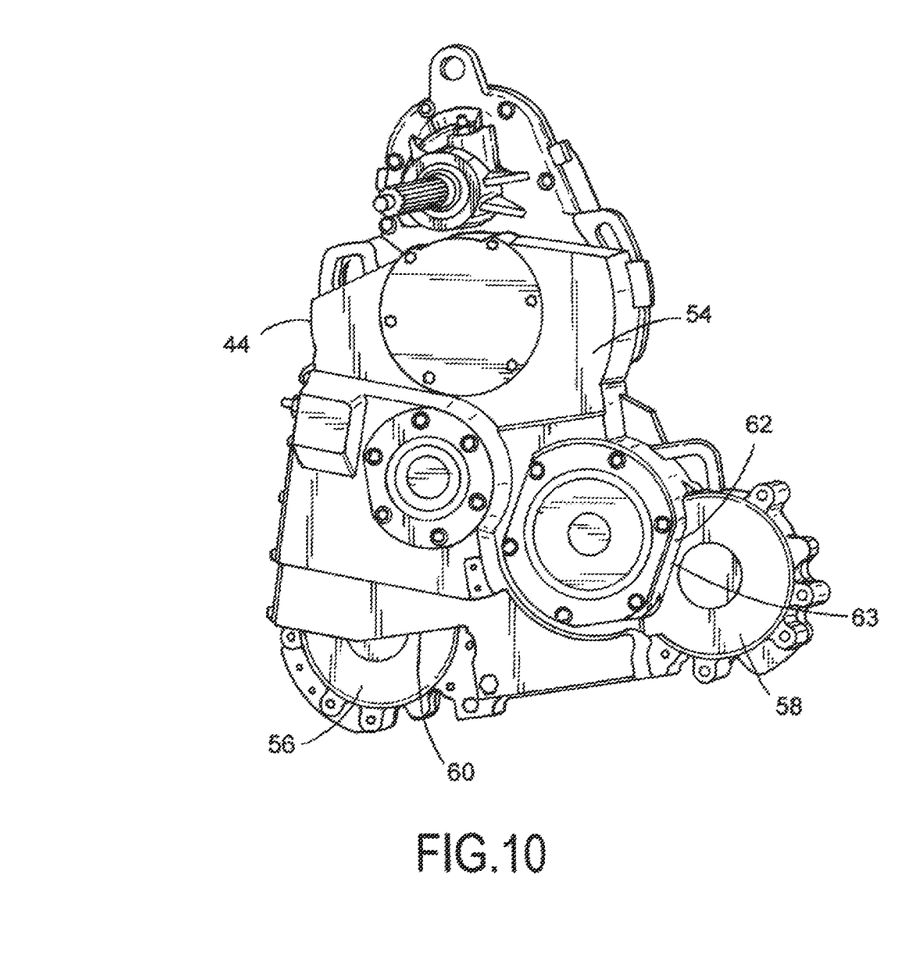
FIG. 10 is another rear perspective view of the gear box assembly of FIG. 1.
Figure 11:
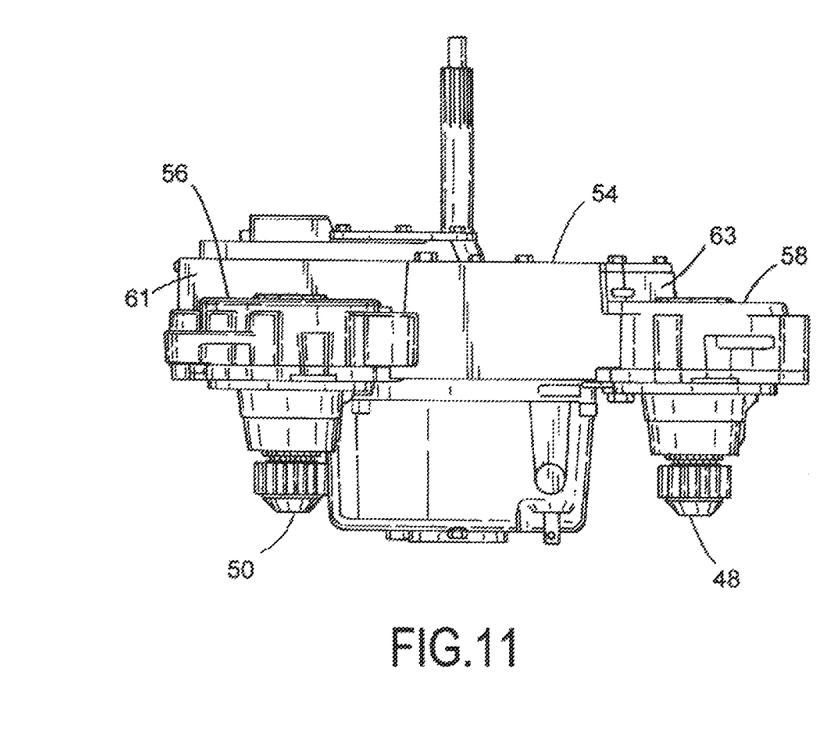
FIG. 11 is a bottom elevation view of the gear box assembly of FIG. 1.

Referring to FIGS. 10 and 11, the posterior aspect of the housing 44 includes the posterior wall 54 that is spaced apart from the gears of the splitter gear assembly 46 housed therein so as to form a space within which a lubricant can be housed and flow. Additionally, the posterior aspect includes wall portions 56, 58 that are sized to closely encase the gears directly attached to and rotatable with the first and second output shafts 48, 50. That is, as shown in FIG. 11, the posterior wall 54 is spaced further upwards compared to wall portions 56, 58. Further, wall portions 56, 58 are formed to encase their respective gears with a minimal amount of headspace so as to facilitate lubrication of the gears therein. Furthermore, the wall portion 56 is configured to extend adjacent the posterior wall 54 along a path 60 (FIG. 10) that extends across a width of the gear housed therein in a substantially cord-like fashion. Similarly, the wall portion 58 is configured to extend adjacent the anterior wall 54 along a path 62 that extends across a width of the gear housed therein in a substantially cord-like fashion.

The portion of the housing 44 extending from the wall portion 56 to the main anterior wall 54 form a first baffle 61 for directing the flow of lubricant within the housing 44 to a location proximate a second output shaft gear 70 (FIG. 7) and to maintain the lubricant about the second output shaft gear 70 location. The portion of the housing 44 extending from the wall portion 58 to the main anterior wall 54 form a second baffle 63 for directing the flow of lubricant to a location proximate a first output shaft gear 74 (FIG. 7) and to maintain the lubricant about the first output shaft gear 74 location. The first and second baffles 61, 63 facilitate directing and maintaining lubricant proximate the first and second output shafts 48, 50 and in contact with the first and second output shaft gears 74, 70, especially when the combine is traveling along uneven or sloped terrains. In sum, the housing 44 includes a plurality of baffles extending along an inside surface of the housing 44 for directing and maintaining a fluid within the housing 44 proximate the first and second output shafts 48, 50.

Figure 12:
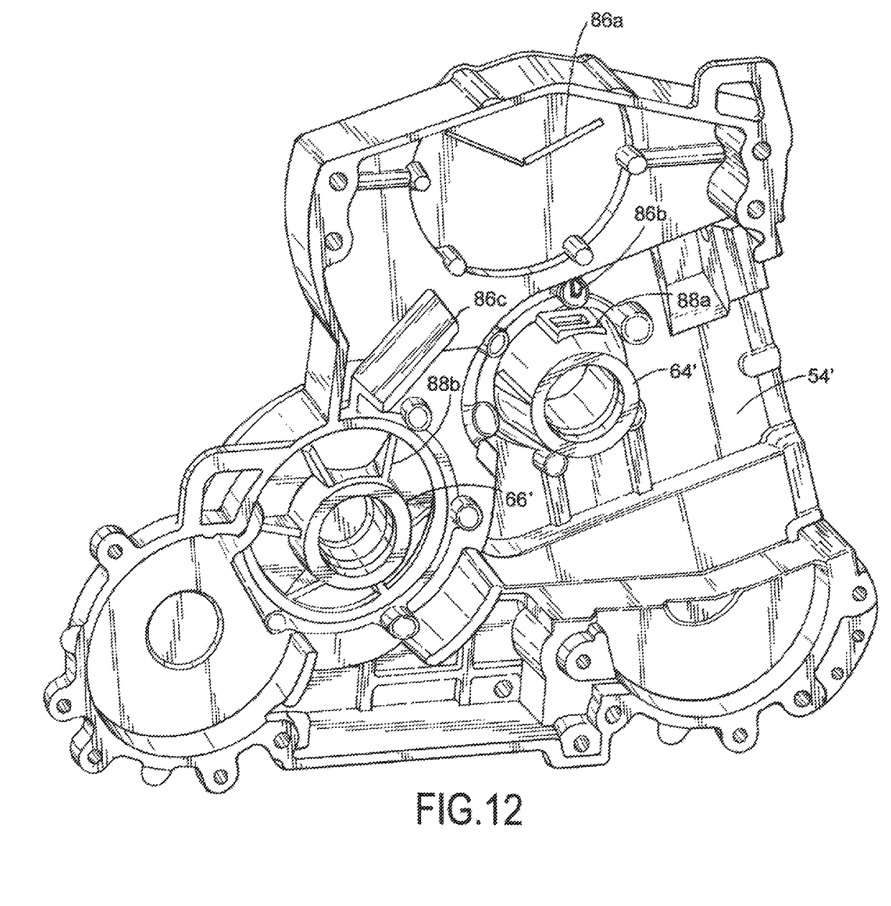
FIG. 12 is a perspective view of an interior of a rear posterior wall of a housing of a splitter gear box shown in FIG. 2.
Figure 13:
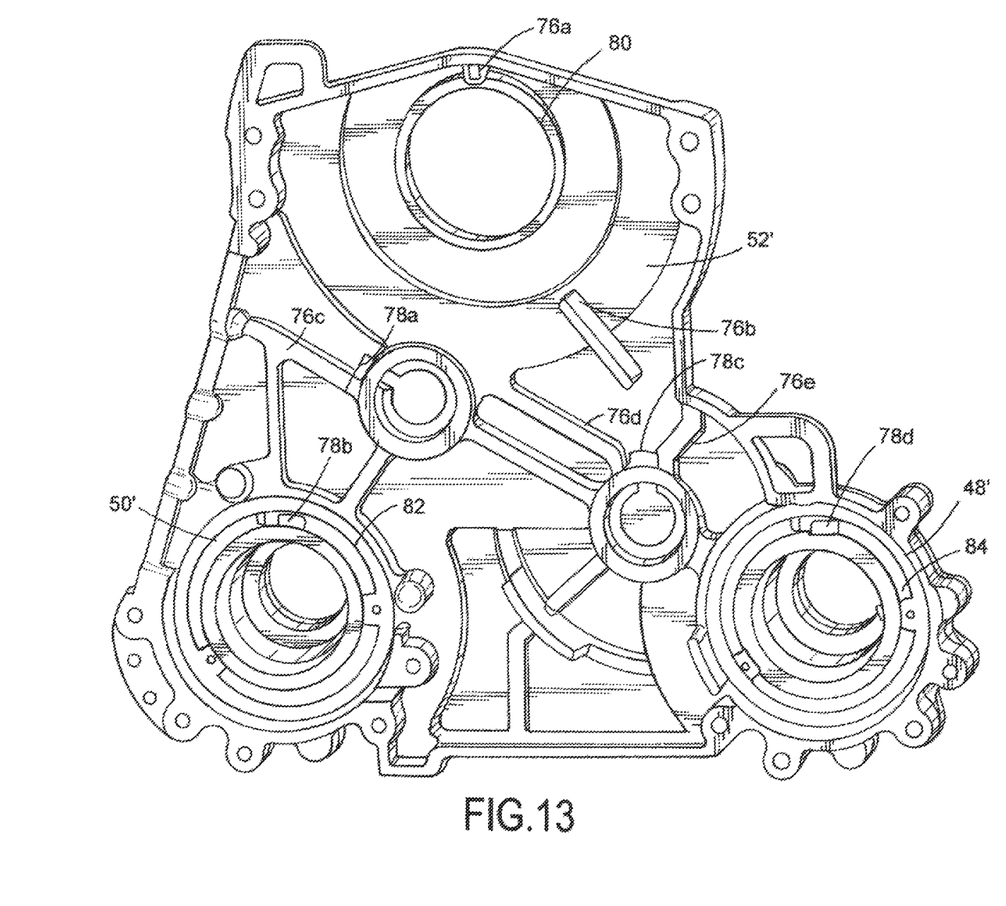
FIG. 13 is a perspective view of an interior of a front anterior wall of a housing of the splitter gear box shown in FIG. 2.

FIGS. 13 and 12 illustrate the interior wall configurations of the front anterior wall 52' and rear posterior wall 54', respectively, of the housing 44. The front anterior wall 52' includes a plurality of fluid directing ribs 76a-e that extend inwardly from the front anterior wall 52' and a plurality of catch pockets 78a-d for catching or retaining a pool or reservoir of fluid e.g., lubricant therein. The rib 76a is a substantially vertically oriented rib positioned about a top portion or proximal end of the front anterior wall 52' above an aperture 80 that the output shaft 20 extends through. Ribs 76b, 76c and 76d are elongated ribs that are angled or sloped relative to a horizontal. Preferably, the ribs 76b-d are angled to direct the flow of fluid within the housing 44 towards the first output shaft 48. The rib 76c extends substantially from first hub 48' associated with the first output shaft 48 across the entire width of the front anterior wall 52'. Rib 76d extends substantially parallel to and above rib 76c, but a length across the width of the front anterior wall 52' a distance shorter than rib 76c. Rib 76b is positioned above ribs 76c and 76d and angled to a greater extent than ribs 76c, 76d is to the horizontal. Rib 76b is also positioned between the aperture 80 and the first hub 48'. Rib 76e is positioned between rib 76b and the first hub 48'. Ribs 76d and 76e form a substantially V-shaped rib to direct the flow of fluid within the housing to catch pocket 78c.

Catch pockets 78a-d are configured about the front anterior wall 52' in a spaced apart manner to facilitate proper lubrication of the gears within the housing 44. Catch pockets 78a-d are also configured as relatively small concave pockets inset within the front anterior wall 52'. Catch pocket 78a is positioned about a mid-portion of the rib 76c. Catch pocket 78b is positioned about a top end of second hub 50' associated with the second output shaft 50. The catch pocket 78b is also positioned within an annular groove 82 of the second hub 50'. Catch pocket 78c is positioned about a bottom end of the V-shaped rib formed by ribs 76d and 76e. Catch pocket 78d is positioned about a top end of the first hub 48' and within an annular groove 84 of the first hub 48'.

The rear anterior wall 54' (FIG. 12) includes a plurality of ribs 86a-c and a plurality of catch pockets 88a, 88b for catching or retaining a pool or reservoir of fluid e.g., lubricant therein. Rib 86a is a substantially V-shaped rib that is positioned about a top end or proximal end of the rear posterior wall 54'. Rib 86b is a substantially vertically oriented rib for directing fluid within the housing 44 towards the catch pocket 88a. Rib 86c is an elongated rib angled from the horizontal so as to extend towards the midline and upwardly of the rear posterior wall 54'. Rib 86c is also configured to direct a flow of fluid within the housing 44 towards catch pocket 88b. Catch pockets 88a, 88b are each configured as substantially horizontal open-toped pockets that extend inwardly of the housing 44 from the rear posterior wall 54'. Catch pockets 88a, 88b are also positioned about a top end portion of hub 64' associated with first idler gear 64 and hub 66' associated with second idler gear 66, respectively. In sum, the housing 44 includes a plurality of catch pockets about a wall of the housing 44. The housing 44 also includes at least one rib for directing a fluid e.g., a lubricant, towards each of the housing's catch pockets.

Figure 14:
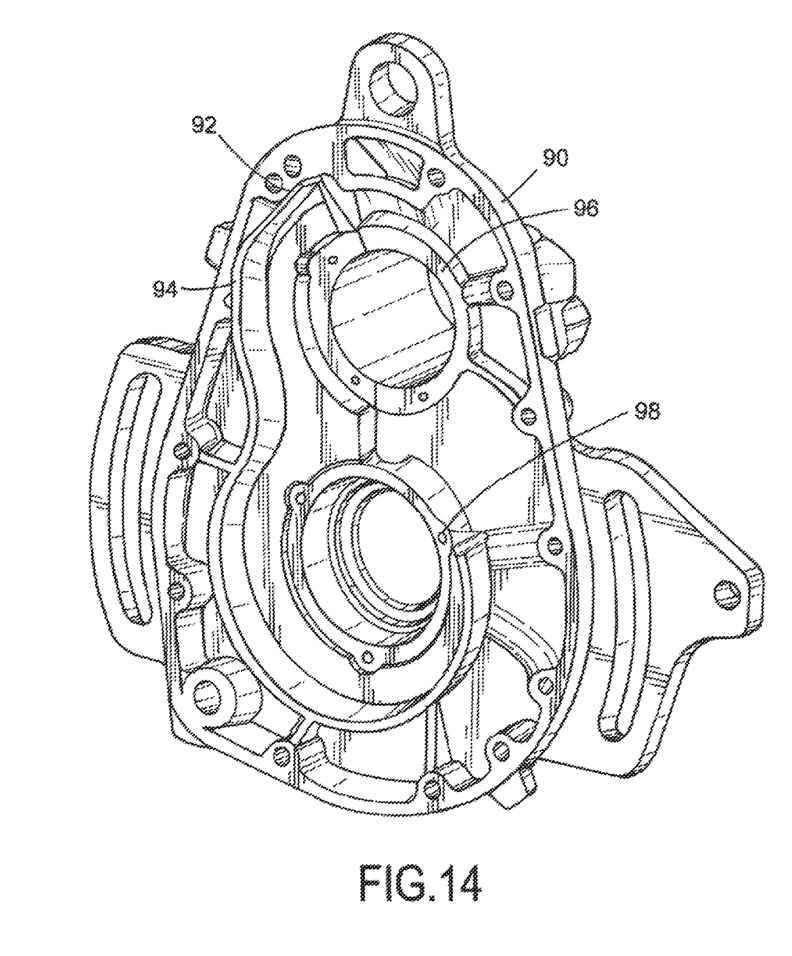
FIG. 14 is a perspective view of an interior wall of a posterior end of a casing of a two speed gear box shown in FIG. 2.

Referring to FIG. 14, the casing 16 includes a posterior end 90. Situated within the posterior end 90 is a fluid pan 92 having a wall portion or baffle 94 extending in a substantially transverse direction to the overall posterior end wall portion. That is, the wall portion 94 extends in an inwardly direction of the casing 16. The posterior end 90 includes aperture 96 for the passage of the input shaft 18 therethrough and aperture 98 for the passage of the output shaft 20 therethrough. The fluid pan 92 has an upper portion that circumscribes the aperture 96 preferably about 170-190 degrees of the aperture 96 and a lower portion that substantially circumscribes the aperture 98 preferably about 270-320 degrees. The fluid pan 92 advantageously provides for lubrication of the gear box's gears by maintain lubrication adjacent or proximate the axis of rotation of the gears associated with the input and output shafts 18, 20.

Referring back to FIG. 2, the splitter gear box 14 has the pilot bore 34 positioned proximate a proximal end or upper end of the housing 44 for engaging the output shaft 20 of the two speed gear box 14. Specifically, the pilot bore 34 includes a gear 35 having splines 37 for receiving corresponding splines 21 about a distal end of the output shaft 20. The pilot bore 34 is positioned about the same side of the housing 44, i.e., the anterior side, as the side the first and second output shafts 48, 50 extend from. The first and second output shafts 48, 50 are positioned proximate a distal end of the splitter gear box 14.

Referring back to FIG. 7, the splitter gear assembly 46 is configured as shown. The splitter gear assembly 46 is housed within the housing 44 and configured to split a torque provided by the output shaft 20 of the two speed gear box 12 between the first output shaft 48 and the second output shaft 50. The splitter gear assembly 46 preferably includes a first idler gear 64 and a second idler gear 66. The first idler gear 64 being a relatively large diameter gear and the second idler gear 66 being a relatively small diameter gear. The first idler gear 64 directly engages the receiving gear 35 operatively connectable to the output shaft 20, the second idler gear 66, and the second output shaft gear 70. The second idler gear 66 directly engages the first idler gear 64 and the first output shaft gear 74. In operation, the torque provided by the output shaft 20 is transmitted to the receiving gear 35, which is then split and provided to the first and second output shafts 48, 50 by operation of the splitter gear assembly 46.

Figure 7:
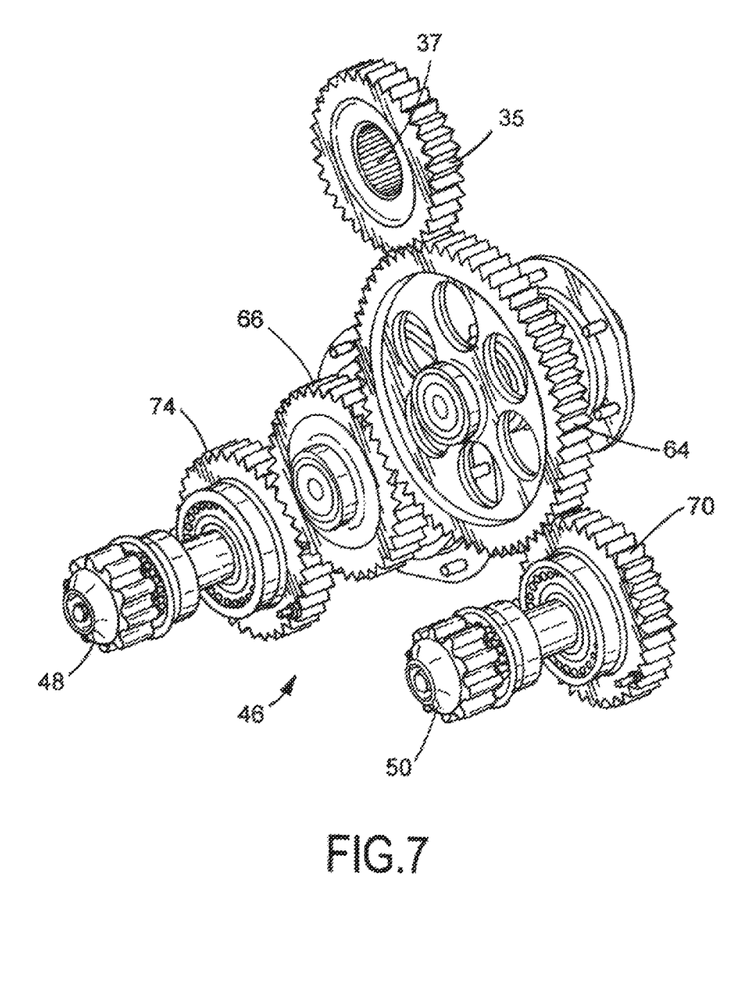
FIG. 7 is a front perspective view of a splitter gear box of the gear box assembly of FIG. 1 without a housing.
Figure 8:
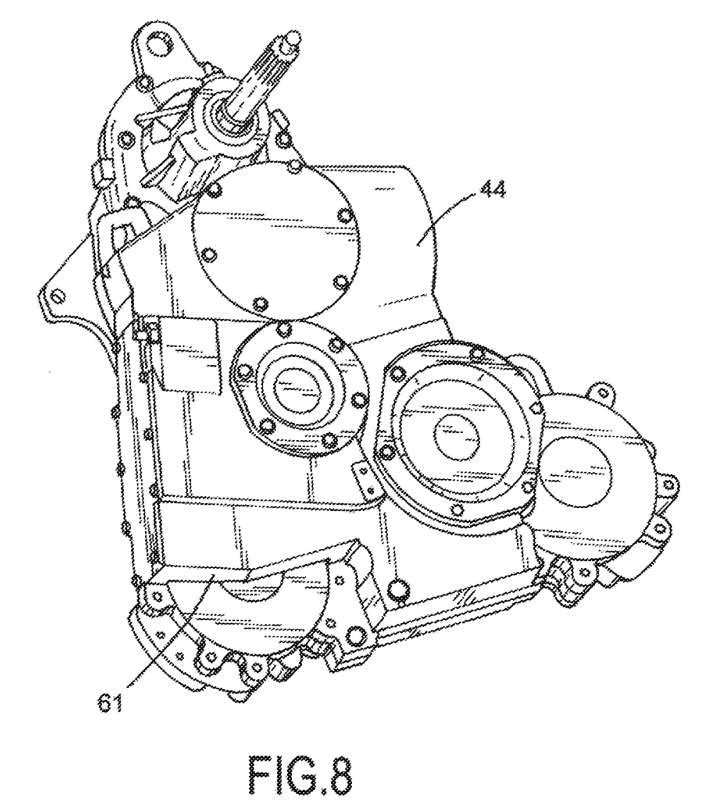
FIG. 8 is a rear perspective view of the gear box assembly of FIG. 1.
Figure 9:
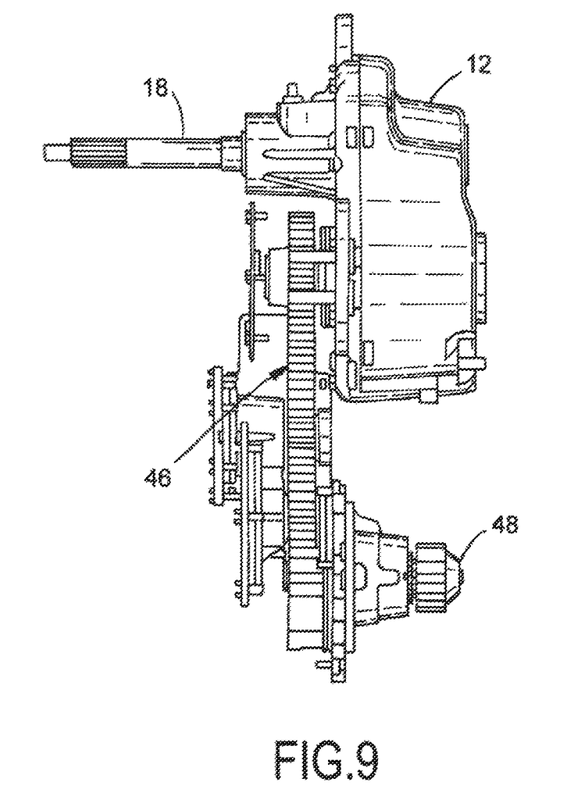
FIG. 9 is a side elevation view of the gear box assembly of FIG. 1 without a housing on a splitter gear box.

The first and second output shafts 48, 50 of the splitter gear assembly 46 are configured to extend out from the housing 44 in an anterior direction. That is, the first and second output shafts 48, 50 extend from the housing 44 in a direction opposite or substantially opposite a direction the output shaft 20 extends from the two speed gear box 12 and preferably in a direction parallel to the output shaft 20. The terminal distal ends of the first and second output shafts 48, 50 are configured to operatively engage twin rotors (not shown) of an agricultural combine.

It will be appreciated by those skilled in the art that changes could be made to the embodiment described above without departing from the broad inventive concept thereof. It is to be understood, therefore, that this invention is not limited to the particular embodiment disclosed, but it is intended to cover modifications within the spirit and scope of the present invention as defined by the appended claims.

We claim:

1. A gear box assembly for a twin rotor combine comprising:
    a two speed gear box having:
        a casing,
        an input shaft,
        an output shaft, and
        a two speed gear assembly housed within the casing and operatively connected between the input shaft and the output shaft; and
    a splitter gear box operatively connected to the output shaft, the splitter gear box having:
        a housing, and
        a splitter gear assembly housed within the housing and configured to split a torque provided by the output shaft between a first output shaft and a second output shaft extending from the housing in a first direction substantially opposite a second direction the output shaft extends from the two speed gear box, wherein an opening for receiving the output shaft of the two speed gear box and the first and second output shafts of the splitter gear box are located on an anterior wall of the housing with respect to the casing; and
    wherein the housing comprises a plurality of baffles extending along an inside surface of the housing for directing and maintaining a fluid within the housing proximate the first and second output shafts.

2. The gear box assembly of claim 1, wherein the plurality of baffles are formed from portions of the housing extending from wall portions of the housing to the anterior wall of the housing extending.

3. The gear box assembly of claim 1, wherein the housing further comprises includes a catch pocket and at least one rib for directing a fluid towards the catch pocket.

4. A gear box assembly for a twin rotor combine comprising:
    a two speed gear box having:
        a casing,
        an input shaft,
        an output shaft, and
        a two speed gear assembly operatively connected between the input shaft and the output shaft; and
    a splitter gear box operatively connected to the output shaft, the splitter gear box having:
        a housing, and
        a splitter gear assembly housed within the housing and configured to split a torque provided by the output shaft of the two speed gear box between a first output shaft and a second output shaft both extending from the housing in a first direction substantially opposite a second direction the output shaft extends from the two speed gear box, wherein an opening for receiving the output shaft of the two speed gear box and the first and second output shafts of the splitter gear box are located on an anterior face of the housing with respect to the casing,
    wherein the housing comprises at least first and second baffle portions extending along an inside surface of the housing for directing and maintaining a fluid housed within the housing proximate the first and second output shafts wherein a first baffle portions extends across a first output shaft gear of the first output shaft and a second baffle portion extends across a second output shaft gear of the second output shaft.

5. The gear box assembly of claim 4, wherein both the input shaft and the output shaft of the two speed gear box extend from a same side of the casing.

6. The gear box assembly of claim 4, wherein the casing includes a pilot circumscribing the output shaft for mounting to a pilot bore of the housing.

7. The gear box assembly of claim 6, wherein the first and second output shafts extend from the housing about a same side of the housing having the pilot bore.

8. The gear box assembly of claim 4, wherein the two speed gear box has a proximal end proximate the input shaft and a distal end proximate the output shaft, and wherein the splitter gear box has a proximal end for engaging the output shaft of the two speed gear box and a distal end proximate the first and second output shafts.

* * * * *